(12) United States Patent
Watanabe (10) Patent No.: US 7,078,954 B2
(45) Date of Patent: Jul. 18, 2006

(54) TEMPERATURE SENSING CIRCUIT

(75) Inventor: Hirofumi Watanabe, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/390,699

(22) Filed: Mar. 19, 2003

(65) Prior Publication Data

US 2003/0214336 A1     Nov. 20, 2003

(30) Foreign Application Priority Data

Mar. 20, 2002 (JP) .............................. 2002-077915

(51) Int. Cl.
*G05F 3/16* (2006.01)
(52) U.S. Cl. ........................ 327/512; 323/315
(58) Field of Classification Search ........ 327/538–541, 327/543, 512–513; 323/312–316
See application file for complete search history.

(56) References Cited

U.S. PATENT DOCUMENTS

| | | |
|---|---|---|
| 5,656,841 A | 8/1997 | Watanabe et al. |
| 5,825,673 A | 10/1998 | Watanabe |
| 5,859,560 A * | 1/1999 | Matthews .................. 327/513 |
| 6,075,404 A | 6/2000 | Shindoh et al. |
| 6,271,730 B1 | 8/2001 | Abe et al. |
| 6,437,550 B1 | 8/2002 | Andoh et al. |
| 6,563,371 B1 * | 5/2003 | Buckley et al. ............. 327/539 |

FOREIGN PATENT DOCUMENTS

| | | |
|---|---|---|
| JP | 7-321288 | 12/1995 |
| JP | 9-243466 | 9/1997 |

OTHER PUBLICATIONS

"Transistor Technology", CQ Publishing, Oct. 1990, pp. 461-469.

Oguey, et al., "MOS Voltage Reference Based on Polysilicon Gate Work Function Difference". IEEE Journal Solid-State Circuits, vol. SC-15, No. 3, pp. 264-269, Jun. 1980.

* cited by examiner

*Primary Examiner*—My-Trang Nu Ton
(74) *Attorney, Agent, or Firm*—Dickenstein Shapiro Morin & Oshinsky LLP

(57) ABSTRACT

A temperature-sensing circuit includes a first circuit block outputting an output voltage having negative or positive temperature coefficients and a second circuit block amplifying the output voltage of the first circuit block to a predetermined amplitude and outputting the amplified output voltage. It further includes a third circuit block producing a voltage having temperature coefficients of a polarity opposite to that of the first circuit block and adding the produced voltage to the output voltage of the second circuit block to cancel out components of second order temperature coefficients contained in the output voltages of the first and second circuit blocks.

13 Claims, 5 Drawing Sheets

⌐ ¬ LIGHTLY DOPED
└ ┘ p-TYPE GATE FET

TEMPERATURE SENSING CIRCUIT

BACKGROUND OF THE INVENTION

1. Field of the Invention

The present invention generally relates to a temperature-sensing circuit using CMOS (complementary metal oxide semiconductor) transistors, and particularly relates to a temperature-sensing circuit capable of performing a stable operation at a high temperature, notably at a temperature above 100° C.

2. Description of the Related Art

There are various types of temperature sensors known in the art.

A first type is a temperature sensor system making use of thermocouples or resistors. In the case of thermocouples, a thermocurrent produced at a contact point between two types of metal wires is amplified by an amplifier and measured by a voltmeter. In the case of resistors, a three-wire bridge arrangement is used such that a voltage change due to the change of resistance is amplified by an amplifier and a change of resistance value due to a change of temperature is measured by a voltmeter.

A second type is a semiconductor temperature sensors using bipolar transistors (see "Transistor technology", CQ publishing, October 1990, p. 469). Such sensors rely on the characteristic that the base-emitter voltage changes linearly in response to the change of temperature. Therefore, the semiconductor temperature sensors are widely used since they reduce production variation and give good accuracy and reproducibility.

A third type is a semiconductor temperature sensor using MOS transistors. For example, it is described in JP-A 9-243466 that a voltage gain β of the MOS transistor is converted into a voltage value and the converted voltage is output as a value representing temperature. JP-A 7-321288 discloses a temperature sensor based on a bipolar transistor similar to a technique described above, but using NPN transistors to achieve a CMOS transistor.

The above-mentioned first type temperature sensor system either using thermocouples or resistors generates a small output. Therefore, in order to amplify the output, it is necessary to connect a high-performance amplifier to the temperature sensor system. Such a complicated electronic circuit results in increased cost and size of the temperature sensor system.

The above-mentioned second type temperature sensor is constructed using a bipolar transistor and thus cannot be integrated into an IC chip fabricated by a standard CMOS process. Also, since a bipolar transistor is a current element controlled by an electric current, it is difficult to construct a circuit with a low current consumption.

Among the temperature sensors of the above-mentioned third type, the temperature sensor disclosed in JP-A 9-243466 is susceptible to process fluctuation since it uses the voltage gain value β. The temperature sensor disclosed in JP-A 7-321288 has a drawback in that it is difficult to form a circuit of low current consumption since the bipolar transistor similar to that used in the second type temperature sensor is a current element controlled by an electric current.

For all of the first, second and third types of temperature sensors, the upper limit of a range within which an accurate sensing can be guaranteed is about 100° C., at which point a reverse leakage current increases at a pn junction. Accuracy of temperature measurement rapidly drops at a temperature higher than the upper limit.

SUMMARY OF THE INVENTION

Accordingly, it is a general object of the present invention to provide a temperature-sensing circuit that can obviate the problems described above.

It is another and more specific object of the present invention to provide a temperature-sensing circuit using a MOS transistor that is operable with a high accuracy at a high temperature, notably at a temperature above 100° C.

In order to achieve the above objects according to the present invention, a temperature-sensing circuit includes:

a first circuit block outputting an output voltage having negative or positive temperature coefficients;

a second circuit block amplifying the output voltage of the first circuit block to a predetermined amplitude and outputting the amplified voltage as an output voltage of the second circuit block; and a third circuit block producing a voltage having temperature coefficients of a polarity opposite to the output voltage of the first circuit block and adding the produced voltage to the output voltage of the second circuit block to cancel out components of second order temperature coefficients contained in the output voltages of both the first and second circuit blocks.

According to the present invention, the above objects can also be achieved by a temperature-sensing circuit including:

a first circuit block outputting an output voltage having negative temperature coefficients;

a second circuit block amplifying the output voltage of the first circuit block to a predetermined amplitude and outputting the amplified voltage as an output voltage of the second circuit block; and a third circuit block producing a voltage having positive temperature coefficients and adding the produced voltage to the output voltage of the second circuit block to cancel out components of second order temperature coefficients contained in the output voltages of both the first and second circuit blocks.

According to the present invention, the above objects can also be achieved by a temperature-sensing circuit including:

a first circuit block outputting an output voltage having negative temperature coefficients;

a third circuit block outputting an output voltage having positive temperature coefficients; and a second circuit block adding the output voltages at a predetermined ratio such that components of second order temperature coefficients contained in the output voltages of both the first and second circuit blocks are cancelled out.

In the temperature-sensing circuits described above, outputs of two of the circuit blocks are added in such a manner that the components of second order temperature coefficients contained in both outputs cancel out. Thus, the output voltages obtained from the temperature-sensing circuits contain first order temperature coefficients only. Accordingly, high-accuracy temperature-sensing circuits can be obtained.

In a preferred embodiment of the present invention, the temperature-sensing circuit includes a pair of MOS transistors. Accordingly, the temperature-sensing circuit can be fabricated at a reduced cost and can be integrated into an IC chip and thus the current consumption can be reduced.

In a preferred embodiment of the present invention provided with an adjusting part capable of adjusting values of the first resistor and the second resistor of the second circuit block after diffusion and film-forming step of a fabrication process, components of the second order temperature coefficients can be completely cancelled out. Thus, a high-accuracy temperature-sensing circuit can be provided.

Thus, according to the present invention, various drawbacks of the circuits using bipolar transistors can be eliminated by since a temperature detection circuit is fabricated using CMOS transistors Thus, since MOS transistors are used, the temperature-sensing circuit of the present invention is operable with low current consumption and can be integrated into an IC chip. Further, since the circuit is arranged to obtain work function differences between a plurality of MOS transistors, a problem of junction leakage can be prevented. Thus, a temperature-sensing circuit operable at a high temperature notably above 100° C. can be provided.

Further, according to the temperature-sensing circuit of the present invention, the effect of process fluctuation is obviated by using MOS transistors having substrates and channels of the same doping density but having gates of opposite conductivity types or the same conductivity type with different impurity concentrations.

DETAILED DESCRIPTION OF THE PREFERRED EMBODIMENTS

In the following, the principle and embodiments of the present invention will be described with reference to the accompanying drawings.

According to the present invention, MOS transistors each having a gate with a work function different from a gate of the other MOS transistor are used for achieving a temperature-sensing circuit operable at a high temperature in a CMOS process. Before explaining embodiments of the present invention, the principle of the present invention will be described.

A threshold voltage Vt for switching ON a channel of a MOS transistor (hereinafter referred to as a transistor) is given by:

$$Vt = \phi ms - Qf/Cox + 2\phi f - Qb/Cox \qquad (1),$$

where, $\phi ms$ is the difference between work function $\phi m$ of the gate and work function $\phi s$ of a substrate, Qf represents fixed electric charges in an oxide film, $\phi f$ represents the Fermi level of the substrate, Qb represents electric charges in a depletion layer between an inversion layer and the substrate and Cox represents capacitance per unit area of the oxide film. The work function $\phi m$ of the gate can be expressed as:

$$\phi m = \chi + Eg/2 + \phi f \qquad (2),$$

where, $\chi$ represents electron affinity and Eg represents band-gap energy.

A first transistor and a second transistor of a pair of transistors used in each first and third circuit blocks of the present invention are identical except that conditions for the gate are different. For example, the polarity of electric conductivity at the gate may be opposite or the polarity may be the same but of different concentration. This implies that for these pairs of transistors, equation (1) takes identical values except for $\phi ms$ and equation (2) takes identical values except for $\phi f$.

The difference between the threshold voltages Vt1 and Vt2 of the pair of transistors, respectively, can be expressed as:

$$\Delta Vt = Vt1 - Vt2 = \phi m1 - \phi m2 = \phi f1 - \phi f2 \qquad (3),$$

where, Vt1, $\phi m1$, $\phi f1$ are threshold voltage, work function at the gate and Fermi level of the substrate, respectively, for the first transistor, and, Vt2, $\phi m2$, $\phi f2$ are threshold voltage, work function at the gate and Fermi level of the substrate, respectively, for the second transistor.

In the first circuit block, the difference between threshold voltages $\Delta Vt$ of a pair of transistors having gate conductivity types of opposite polarities is obtained. In a particular embodiment, the pair of transistors consists of a first MOS transistor having a heavily doped n-type gate and a second MOS transistor having a heavily doped p-type gate.

Since both n-type and p-type are heavily doped, $\phi f1$ of n-type is near Conduction band and $\phi f2$ of p-type is near Valence band and thus ($\phi f1 - \phi f2$) takes a value near the band gap of Si, which may be about 1.12 V.

In IEEE J. Solid-State Circuits, vol. SC-15, pp. 264, June 1980, there is an article on the consideration of the difference of Vt for a similar structure. Therein, the difference of Vt is expressed by an equation:

$$\Delta Vt(T) = \Delta \phi f0 - (\alpha T^2)/T + \beta,$$

where $\Delta \phi f0$ is $\Delta \phi f$ (=$\phi f1 - \phi f2$) at absolute zero degrees, T represents absolute temperature, $\alpha$ and $\beta$ are constants which take values of 7.02E-4 V/K and 1.109 K, respectively.

Figure 3A:
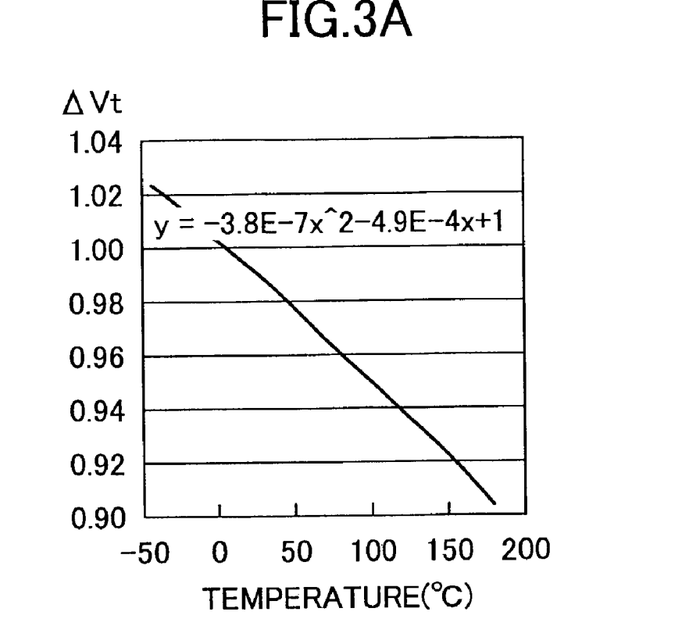
FIG. 3A is a graph showing a temperature characteristic curve of a first circuit block of the present invention.

FIG. 3A is a graph of $\Delta Vt$ against temperature. As can be seen in the graph, $\Delta Vt$ has a negative temperature characteristic. A detailed analysis of the characteristic curve indicates that it has a negative first order temperature coefficient and also a negative second order temperature coefficient. It is to be noted that the second order temperature coefficient has an adverse effect on the linearity between temperature and voltage and thus it is desirable to minimize the second order temperature coefficient.

In the third circuit block, the difference of Vt between a pair of transistors of "same conductivity type and different impurity concentration" is derived. In a particular embodiment, the pair of transistors includes a first MOS transistor having a heavily doped p-type gate and a second MOS transistor having a lightly doped P-type gate.

Accordingly, it can be derived from Equation (3) that:

$$\Delta Vt = Vt1 - Vt2 = \phi m1 - \phi m2 = \phi f1 - \phi f2 \qquad (4)$$
$$= -kT/q \ln(Ng1/Ni) + kT/q \ln(Ng2/Ni)$$
$$= kT/q \ln(Ng2/Ng1),$$

where Ng1 and Ng2, respectively, represent lightly and heavily doped gates of the same conductivity type. In Equation (3), k is the Boltzmann constant, q is an amount of charge of electrons, T is absolute temperature, Eg is the band gap of silicon and Ni is carrier concentration of an intrinsic semiconductor.

Figure 3B:
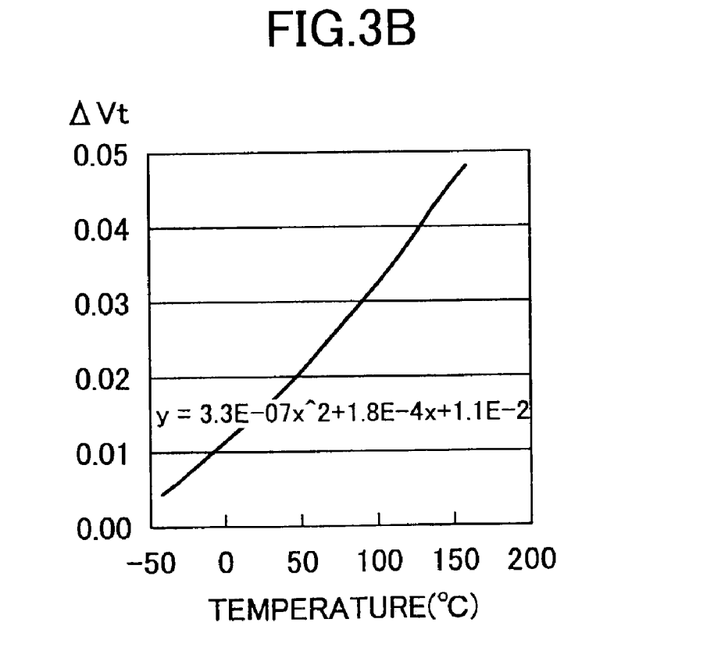
FIG. 3B is a graph showing a temperature characteristic curve of a third circuit block of the present invention.

Referring to Equation (4), it appears that $\Delta Vt$ has a linear relationship against absolute temperature T, or in other words, it appears that $\Delta Vt$ can be expressed by a first order positive temperature coefficient only. However, since Ng1 is lightly doped, the effective carrier concentration is not in fact equal to Ng1 and the carrier concentration Ng1 itself has a positive temperature coefficient. Therefore, temperature characteristics of $\Delta Vt$ appear in a superposed manner as shown in FIG. 3B which is a plot of a result of actual measurement. As can be seen in the graph, $\Delta Vt$ has a positive temperature characteristic. A detailed analysis of the characteristic curve indicates that it has a positive first order temperature coefficient and also a positive second order temperature coefficient. Because of the second order temperature coefficient, this characteristic alone is not suitable for being used as a high-precision temperature-sensing circuit for the same reason as for the first circuit block.

Therefore, according to the present invention, in order to cancel out the negative second order temperature coefficient contained in the output of the first circuit block and the positive second order temperature coefficient contained in the output of the third circuit block, these outputs are added (or mixed) in the second circuit block at a predetermined ratio.

Figure 4:
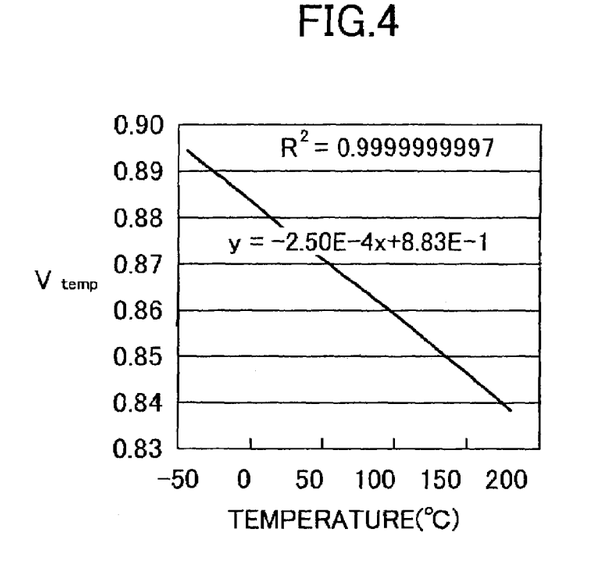
FIG. 4 is a graph showing a temperature characteristic curve of an output of a temperature-sensing circuit of the present invention.

FIG. 4 is a graph showing a result of an operation of multiplying the negative second order output of the first circuit block by a factor of 0.86 in the second circuit block and then adding it with the positive second order temperature coefficient of the third circuit block. As a result of the operation, the second order temperature coefficient is cancelled out and an output voltage having a substantially perfectly first order temperature coefficient (correlation coefficient $R^2$ representing the degree of correlation against a straight line is 0.9999999997). Accordingly, a high-precision temperature-sensing circuit can be achieved.

As has been described above, the output voltages having positive temperature coefficients or negative temperature coefficients are all obtained by taking the difference of Vt as the difference between work functions of the gates. As can be understood from Equation (3), this value is the difference between inherent physical number $\phi f$ of poly silicon (Poly Si) used as a gate material of the MOS transistors. Therefore, essentially, this value is not affected by the structure or mode of use of the device. Accordingly, unlike the temperature-sensing method using the temperature characteristic of the current value at the pn-junction, the temperature detecting circuit of the present invention is capable of performing a high-precision sensing at a temperature higher than 100° C., since there is no increase of reverse leakage current at the pn-junction and there is less effect due to process fluctuation.

In the following, embodiments of circuit configurations for realizing the principle of the present invention will be described in detail.

Figure 5:
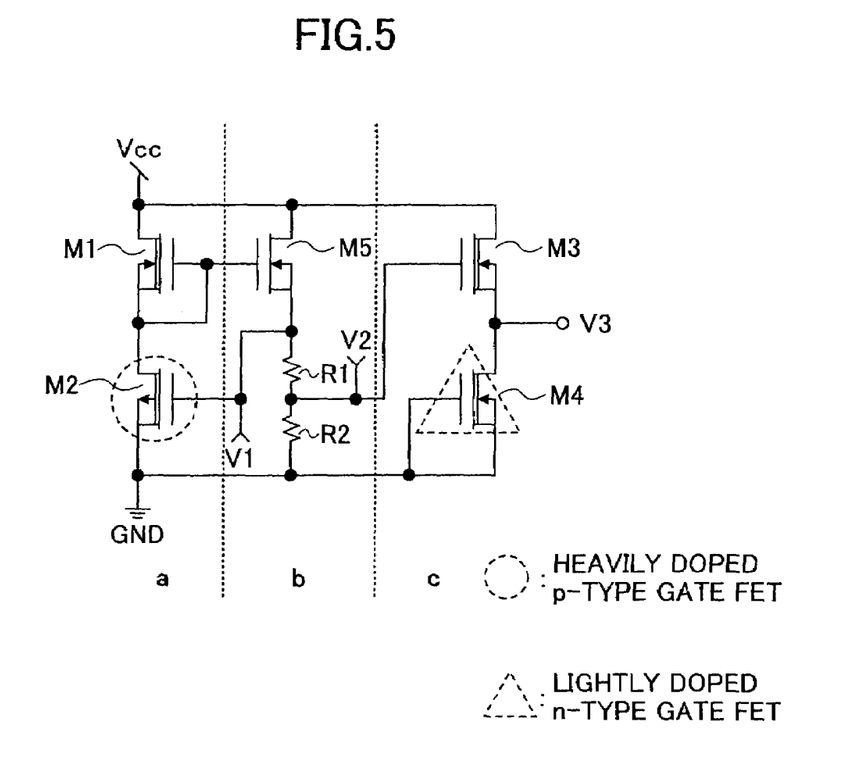
FIG. 5 is a diagram showing a circuit arrangement of a first embodiment of the temperature-sensing circuit of the present invention.

FIG. 5 shows a circuit configuration of the first embodiment of the present invention in which MOS transistors M1 and M2 form the first circuit block, a MOS transistor M5 and resistors R1 and R2 form the second block and MOS transistors M3 and M4 form the third circuit block.

First, a detailed circuit configuration for obtaining the difference between threshold voltages Vt of a pair of MOS transistors in the first circuit block will be described. In the figure, the MOS transistor M2 indicated by a circle has a heavily doped p-type polysilicon gate and the MOS transistor M1 has a heavily doped n-type polysilicon gate.

Drain current Id of the MOS transistor in a saturation region (Vds>Vgs−Vt) is represented by:

$$Id = (\beta/2)(Vgs - Vt)^2 \qquad (5),$$

where Vgs represents gate-source voltage of the MOS transistor.

In the Equation, $\beta$ represents the conductivity coefficient of the MOS transistor and is expressed by an equation:

$$\beta = \mu(\epsilon ox/Tox)(Weff/Leff) \qquad (6),$$

where, $\mu$ represents mobility of carrier, $\epsilon ox$ represents permittivity of oxide film, Tox represents thickness of oxide film, Weff represents effective channel width and Leff represents effective channel length.

The MOS transistors M1 and M2 forming a pair have similar structures except for the polarity of impurities of the gate electrodes. Accordingly, since the mobility of carrier $\mu$, the permittivity of oxide film $\epsilon ox$, the thickness of oxide film Tox, the effective channel width Weff, and the effective channel length Leff are the same for both transistors, the value $\beta$ is the same for both transistors. Therefore, drain currents Id1 and Id2 of the MOS transistors M1 and M2, respectively, can be represented by:

$$Id1 = (\beta/2)(Vgs1 - Vt1)^2 \qquad (7),$$
$$Id2 = (\beta/2)(Vgs2 - Vt2)^2 \qquad (8),$$

where Vgs1 and Vgs2 are gate-source voltages of the MOS transistors M1 and M2, respectively.

As can be seen in FIG. 5, since the transistors M1 and M2 are in series connection between the power supply Vcc and the ground GND, the drain currents are equal, i.e., Id1=Id2. Therefore, from Equations (7) and (8), it can be derived that:

$$Vgs1 - Vgs2 = Vt1 - Vt2 = \Delta Vt \qquad (9).$$

Since it is known that for the MOS transistor M1, Vgs1=0V, it can be expressed that:

$$Vgs2 = Vt2 - Vt1 \qquad (10).$$

Accordingly, it can be seen that Vgs2=$\Delta Vt$=V1 and this voltage V1 has the second order temperature coefficient that has been described in the description of the principle of the present invention. This voltage V1 is supplied to the second circuit block of the next stage.

The second circuit block includes the MOS transistor M5 and a series connection of the first resistor R1 and the second resistor R2. The output of the first block is applied to a connecting point between the MOS transistor M5 and the resistor R1 and the gate voltage of the MOS transistor M5 is supplied as a feed back voltage to the first circuit block, so as to form a source-follower circuit. In the present embodiment, the ratio between the resistor R1 and the resistor R2 is determined such that the voltage V2 at an output of the second circuit block of FIG. 5 is expressed by:

$$V2 = 0.86 \times V1 \tag{11}$$

The voltage V2 is supplied to the third circuit block of the next stage.

As has been explained with reference to FIG. 4, the value 0.86 is selected for cancelling out the second order temperature coefficient components by adding the output containing the negative second order temperature coefficient from the first circuit block and the output containing the positive second order temperature coefficient from the third circuit block, in order to obtain a high-precision output voltage that contains the first order temperature coefficient only.

Figure 9:
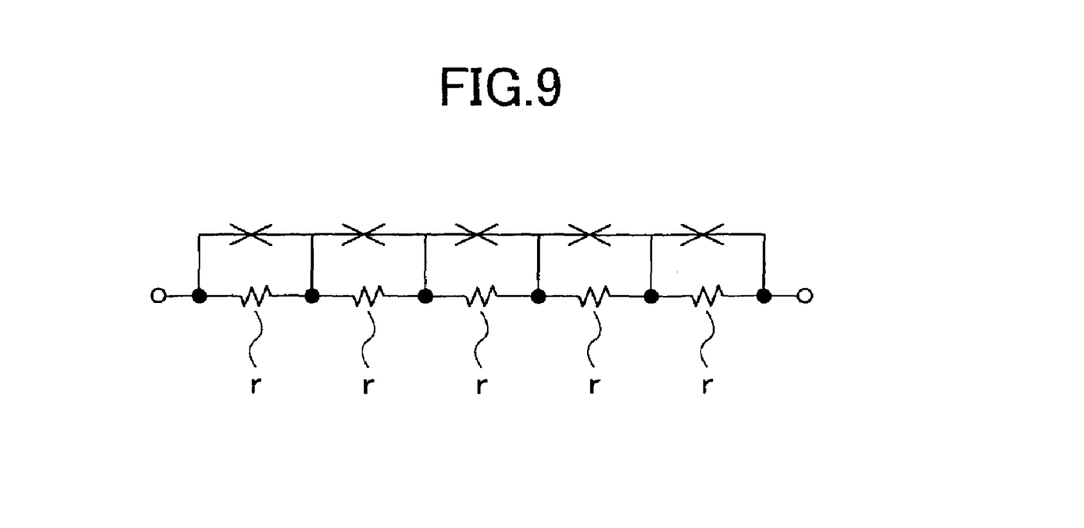
FIG. 9 is a diagram showing trimmable resistors.

It is to be noted that resistance values of the resistors R1 and R2 may vary slightly due to the difference between processes. In order to obtain a predetermined resistance ratio, one or both of the resistors R1 and R2 are formed as a resistive body arranged in a manner, for example, shown in FIG. 9, and then, after diffusion and film-forming processes, a laser beam is selectively irradiated on adjustment parts indicated by a "x" mark to trim the resistive body. By obtaining a predetermined resistance ratio by correcting the resistance values of the resistors R1 and R2 using such trimming means (resistance value adjusting means), the second order temperature coefficient components can be completely eliminated.

In the third circuit block, the MOS transistor M4 indicated by a triangle has a lightly doped (Ng1) n-type polysilicon gate. In a manner similar to the transistor M1, the MOS transistor M3 has a heavily doped (Ng2) n-type polysilicon gate. In a manner similar to the first circuit block, the difference ΔVt between the threshold voltages Vt4 and Vt3 of the transistors M4 and M3, respectively, is considered. Then, the gate-source voltage Vgs3 of the MOS transistor M3 can be expressed as:

$$Vgs3 = -\Delta Vt = -(Vt4 - Vt3) \tag{12}$$

where ΔVt is the voltage containing the second order temperature coefficient that has been explained in the principle of the present invention. Since the voltage V2 containing the negative temperature coefficient is supplied from the upstream stage, the output V3 of the third circuit block can be expressed by:

$$V3 = V2 - Vgs3 = V2 - (-\Delta Vt) = V2 + \Delta Vt \tag{13}$$

where V3 corresponds to Vtemp indicated in FIG. 4.

Thus, according to the arrangement described above, the outputs of the first and third circuit blocks are added such that the negative second order temperature coefficient component contained in output of the first circuit block and the-positive second order temperature coefficient component contained in the output of the third circuit block cancel each other. Therefore, since the second order temperature coefficient is cancelled out, the output V3 (Vtemp) has a high-precision temperature characteristic containing the first order temperature coefficient only.

In the above-mentioned first embodiment of the present invention, the MOS transistors are all N-channel transistors. An essential requirement for a pair of MOS transistors is that all elements except for the gate be the same. That is to say, the MOS transistors show a degree of being a paired structure. In order to achieve this, it is necessary that the substrate potential of the MOS transistor be independent from the other MOS transistor and that the substrate potential and the source potential are made equal to eliminate a back-bias effect. According to the first embodiment of the present invention, this is achieved by providing an N-channel transistor formed in an independent P-well.

Figure 6:
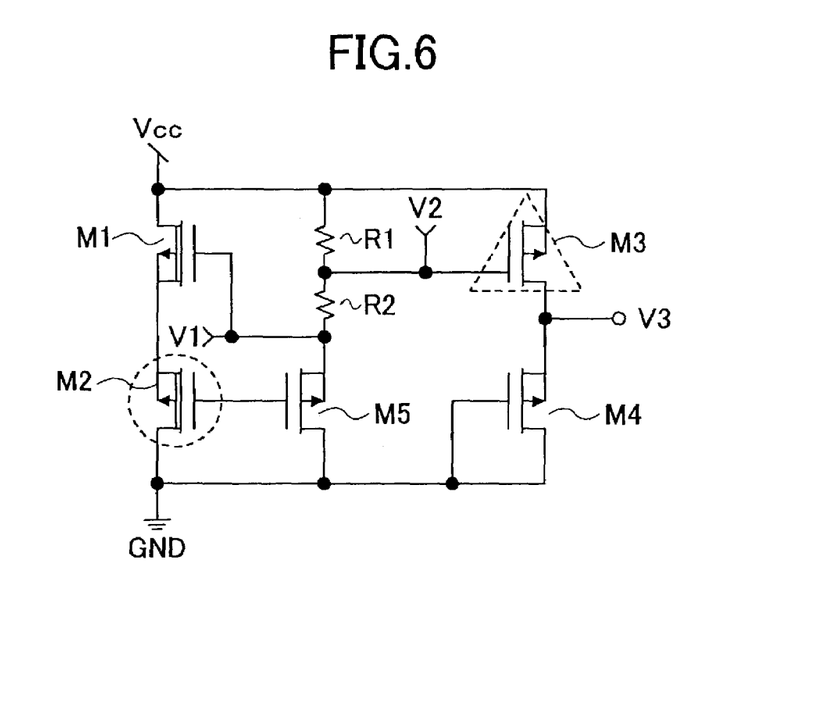
FIG. 6 is a diagram showing a circuit arrangement of a second embodiment of the temperature-sensing circuit of the present invention.

However, in some technologies, there may be a case where there are independent N-wells but no P-well. In such a case, the MOS transistor is formed on a P-channel. This is the second embodiment of the present invention. FIG. 6 shows a circuit configuration of the second embodiment of the present invention. Circuit arrangements of the first, second and third circuit blocks, calculation of the difference of Vt and a manner in which V1, V2 and V3 are generated are the same as in the first embodiment. It is to be noted that in the first circuit block, the voltage containing a negative second order temperature coefficient is output from the power supply Vcc, and in the second circuit block, the output V2 is also output as a voltage from the power supply Vcc. Therefore, the output V3 of the third circuit block that is a final output voltage obtained by adding the negative second order temperature coefficients is output as a voltage from the ground GND.

Figure 7:
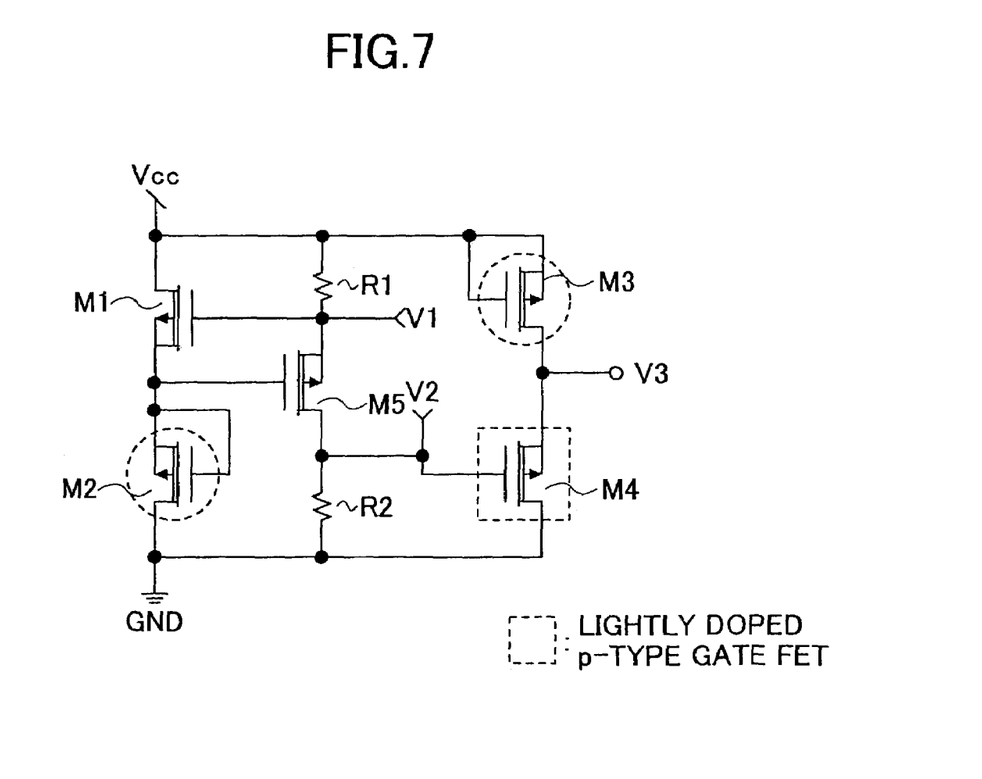
FIG. 7 is a diagram showing a circuit arrangement of a third embodiment of the temperature-sensing circuit of the present invention.

According to the above-mentioned second embodiment of the present invention, the final output V3 is converted into an output from the ground GND in the third circuit block. Also, the third circuit block is formed by the first MOS transistor having a heavily doped n-type gate and the second MOS transistor having a lightly doped n-type gate. According to the third embodiment of the present invention, the voltage from the power supply Vcc is converted into an output from the ground GND in the second circuit block. Also, the second circuit block is formed by the first MOS transistor having a heavily doped p-type gate and the second MOS transistor having a lightly doped p-type gate.

The MOS transistor M4 indicated by a square has a lightly doped (Ng1) p-type polysilicon gate. The MOS transistor M3 indicated by a circle has a heavily doped (Ng2) p-type polysilicon gate. Calculation of the difference of Vt and a manner in which V1, V2 and V3 are generated are the same as in the first embodiment.

Figure 8:
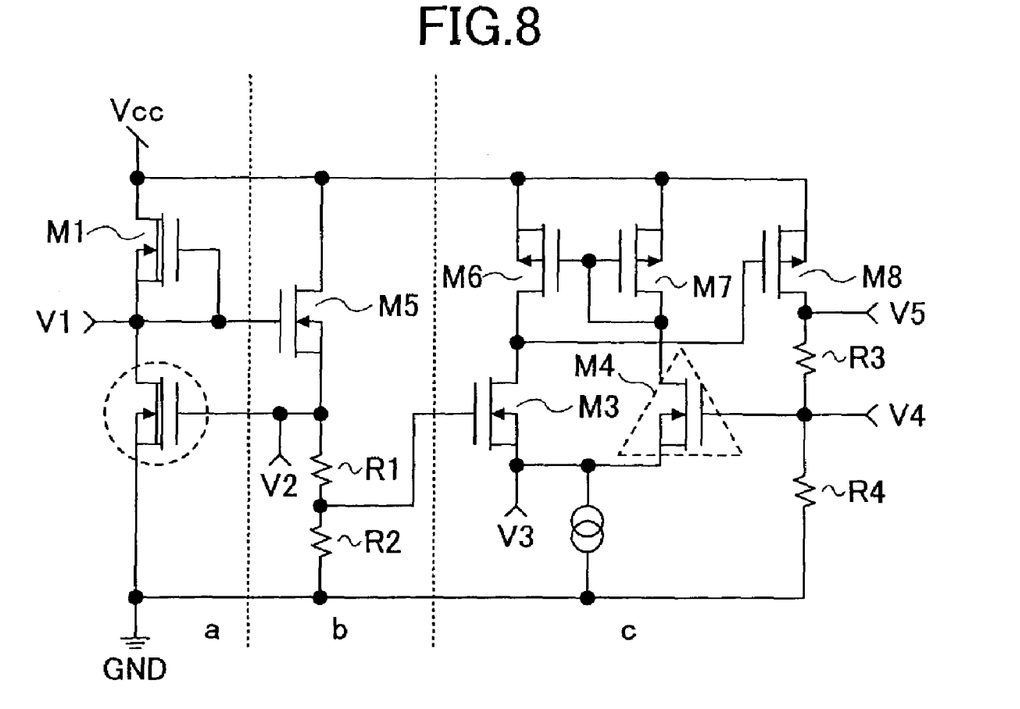
FIG. 8 is a diagram showing a circuit arrangement of a fourth embodiment of the temperature-sensing circuit of the present invention.

FIG. 8 shows a circuit configuration of the fourth embodiment of the present invention. In the fourth embodiment, the first circuit block "a" and the second circuit block "b" are the same as those of the first embodiment (see FIG. 5). The fourth embodiment of the present invention is characterized in that the third circuit block "c" is formed as a negative-feedback operation amplifier.

That is to say, in the third circuit block "c", the MOS transistor M3 having a heavily doped n-type gate and the MOS transistor M4 having a lightly doped n-type gate serve as input MOS transistors of the first stage differential amplifier. The output V3 of the upstream second circuit block is input into the MOS transistor M3. Since the Vt of the MOS transistors of the differential inputs are different, V4 of the third circuit block V4 is a voltage obtained by adding the difference of Vt between the MOS transistor M3 and the MOS transistor M4 (ΔVt) and the gate voltage V3 of the MOS transistor M3.

That is to say, the voltage V3 containing the negative second order temperature coefficient and the voltage containing the positive second order temperature coefficient (the difference between the Vt of the MOS transistor M3 and Vt of the MOS transistor M4) are added and the voltage V4 having the first order temperature coefficient in which only the second order temperature coefficient is cancelled out is obtained. Also, since the third block is configured as an operation amplifier, the output voltage can be output as a voltage V5 that is obtained by multiplying V4 by a certain factor.

Finally, a process of fabricating a MOS transistor will be described. Gates of different impurity concentrations may be formed by performing the steps of depositing a non-doped gate, masking portions to be formed into lightly doped gates by an oxide film, heavily doping portions that are not masked by deposition of phosphor, etching the masking oxide film and lightly doping phosphor or boron into the lightly doped portions by ion-implantation.

It is also possible to form the heavily doped portion by ion-implantation in a similar manner to the lightly doped portion. Thus, a pair of MOS transistors having gates of same conductivity type and different Fermi level $\phi f$ can be formed. Since the same process is used except for the doping step of the gate, the gate is formed with the same thickness of insulation film, channel dope, channel length and channel width. Therefore, the only difference is the concentration of impurity, and the difference in the threshold voltages Vt is equivalent to the difference in the Fermi levels $\phi f$.

Each of the above-mentioned embodiments makes use of an n-type channel MOS transistor and a p-type channel MOS transistor as MOS transistors M1 and M2 with the gate being a combination of a heavily or lightly doped n-type region or a heavily or lightly doped p-type region. However, when the circuit is configured using the first, second and third circuit blocks of the present invention, a similar circuit can be easily obtained using the gate of other combinations.

Also, each of the above-mentioned embodiments is characterized in that the first circuit block outputs a voltage containing a "negative" second order temperature coefficient and the third circuit block outputs a voltage containing a "positive" temperature coefficient. However, it is possible to obtain the same configuration with the first circuit block outputting a voltage containing a "positive" second order temperature coefficient and the third circuit block outputs a voltage containing a "negative" temperature coefficient.

Figure 1:
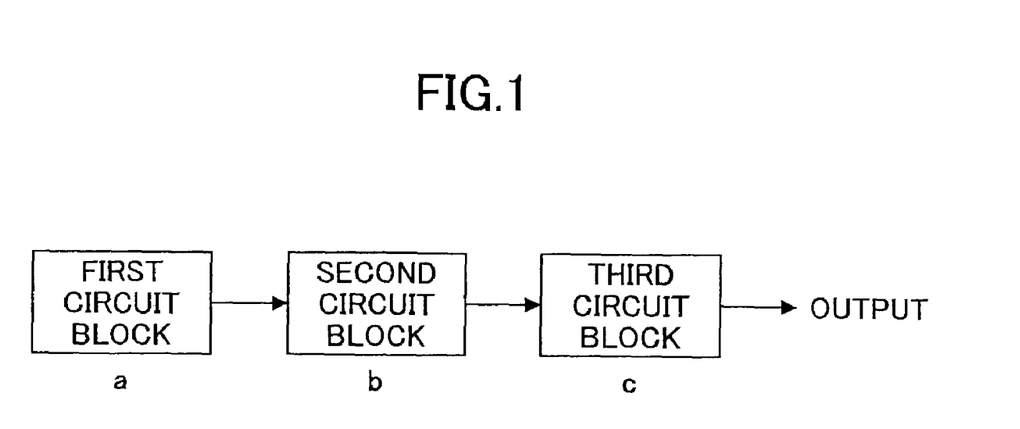
FIG. 1 is a block diagram showing a principle of the present invention.
Figure 2:
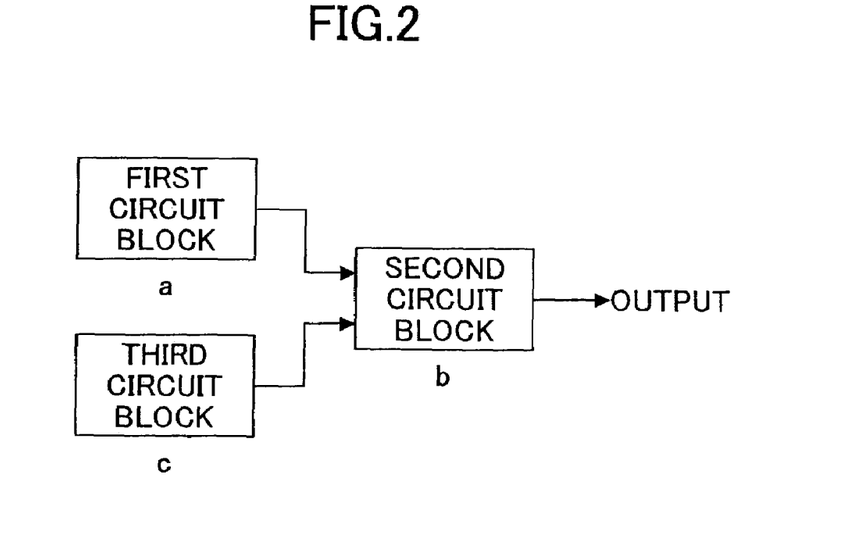
FIG. 2 is a block diagram showing another principle of the present invention.

Also, each of the above-mentioned embodiments has been explained with reference to the block configuration shown in FIG. 1, but it is also possible to implement each of the embodiments in accordance with the block configuration shown in FIG. 2.

Further, the present invention is not limited to these embodiments, and variations and modifications may be made without departing from the scope of the present invention.

The present application is based on Japanese priority application No. 2002-077915 filed on Mar. 20, 2002, the entire contents of which are hereby incorporated by reference.

What is claimed is:

1. A temperature-sensing circuit comprising:
a first circuit block outputting an output voltage having one of negative and positive temperature coefficients;
a second circuit block comprising a resistive circuit configured to a predetermined resistive ratio, said second circuit block amplifying said output voltage of the first circuit block to a predetermined amplitude and outputting the amplified voltage as an output voltage of said second circuit block; and
a third circuit block producing a voltage having temperature coefficients of a polarity opposite to said output voltage of said first circuit block and adding said produced voltage to said output voltage of the second circuit block to cancel out second order temperature coefficient components contained in said output voltages of both said first and second circuit blocks, wherein said second order temperature coefficient components are canceled out based on a voltage generated by the predetermined resistive ratio of said resistive circuit, and wherein resistances of said resistive circuit are trimmable to achieve the predetermined resistive ratio.

2. A temperature-sensing circuit comprising:
a first circuit block outputting an output voltage having negative temperature coefficients;
a second circuit block comprising a resistive circuit configured to a predetermined resistive ratio, said second circuit block amplifying said output voltage of the first circuit block to a predetermined amplitude and outputting the amplified voltage as an output voltage of said second circuit block; and
a third circuit block producing a voltage having positive temperature coefficients and adding said produced voltage to said output voltage of the second circuit block to cancel out second order temperature coefficient components contained in said output voltages of both said first and second circuit blocks, wherein said second order temperature coefficient components are canceled out based on a voltage generated by the predetermined resistive ratio of said resistive circuit, and wherein resistances of said resistive circuit are trimmable to achieve the predetermined resistive ratio.

3. The temperature-sensing circuit as claimed in claim 2, wherein said first circuit block comprises a pair of MOS transistors of mutually opposite conductivity types, the difference of work functions of gate electrodes of said pair of MOS transistors being output as said output voltage of said first circuit block.

4. The temperature-sensing circuit as claimed in claim 2, wherein said first circuit block comprises a first MOS transistor having a heavily doped n-type gate and a second MOS transistor having a heavily doped p-type gate, an output of said output voltage from said second circuit block is fed back to said gate of said first MOS transistor, and the difference of gate-source voltages of said first MOS transistor and said second MOS transistor is output as said output voltage of said first circuit block.

5. The temperature-sensing circuit as claimed in claim 2, wherein said second circuit block comprises a series connection of a MOS transistor, a first resistor and a second resistor of the resistive circuit, said series connection forming a feed-back path to said first circuit block such that a gate voltage of said MOS transistor is fed back as a feedback voltage to said first circuit block, and a voltage at a connecting point between said first and second resistors is supplied to said third block.

6. A temperature-sensing circuit comprising:
a first circuit block outputting an output voltage having negative temperature coefficients;
a third circuit block outputting an output voltage having positive temperature coefficients; and
a second circuit block comprising a resistive circuit configured to a predetermined resistive ratio, said second circuit block adding said output voltages at the predetermined resistive ratio of said resistive circuit such that components of second order temperature coefficients contained in said output voltages of both said first and second circuit blocks are cancelled out, and wherein resistances of said resistive circuit are trimmable to achieve the predetermined resistive ratio.

7. The temperature-sensing circuit as claimed in claim 6, wherein said first circuit block comprises a pair of MOS transistors of mutually opposite conductivity types, the difference of work functions of gate electrodes of said pair of MOS transistors being output as said output voltage of said first circuit block.

8. The temperature-sensing circuit as claimed in claim 6, wherein said first circuit block comprises a first MOS transistor having a heavily doped n-type gate and a second MOS transistor having a heavily doped p-type gate, an output of said output voltage from said second circuit block is fed back to said gate of said first MOS transistor, and the difference of gate-source voltages of said first MOS transistor and said second MOS transistor is output as said output voltage of said first circuit block.

9. The temperature-sensing circuit as claimed in claim 6, wherein said second circuit block comprises a series connection of a MOS transistor, a first resistor and a second resistor of the resistive circuit, said series connection forming a feed-back path to said first circuit block such that a gate voltage of said MOS transistor is fed back as a feedback voltage to said first circuit block, and a voltage at a connecting point between said first and second resistors is supplied to said third block.

10. The temperature-sensing circuit as claimed in claim 9, further comprising an adjusting part capable of adjusting values of said first resistor and said second resistor of said second circuit block after diffusion and film-forming steps of a fabrication process.

11. The temperature-sensing circuit as claimed in claim 6, wherein said third circuit block comprises a pair of MOS transistors of mutually different gate impurity concentrations, the difference of work functions of the gate electrodes of said pair of MOS transistors being output as said output voltage of said third circuit block.

12. The temperature-sensing circuit as claimed in claim 11, wherein said first circuit block comprises a first MOS transistor having a heavily doped n-type gate and a second MOS transistor having a lightly doped n-type gate, said output voltage from said second circuit block being applied to said gate of said first MOS transistor, the difference of gate-source voltages of said first MOS transistor and said second MOS transistor being output as said output voltage of said first circuit block.

13. The temperature-sensing circuit as claimed in claim 11, wherein said first circuit block comprises a first MOS transistor having a heavily doped p-type gate and a second MOS transistor having a lightly doped p-type gate, said output voltage from said second circuit block being applied to said gate of said first MOS transistor, the difference of gate-source voltages of said first MOS transistor and said second MOS transistor being output as said output voltage of said first circuit block.

* * * * *